United States Patent Office 2,865,870
Patented Dec. 23, 1958

2,865,870

LACQUER COMPOSITION COMPRISING EPOXIDE RESIN, POLYAMIDE RESIN AND CELLULOSE ACETATE BUTYRATE AND ARTICLE COATED THEREWITH

Raymond G. Pinder, Rochester, N. Y., assignor to Eastman Kodak Company, Rochester, N. Y., a corporation of New Jersey No Drawing. Application October 24, 1955
Serial No. 542,496

4 Claims. (Cl. 260—13)

This invention relates to lacquers and more particularly to metallic appearing or pigmented lacquers which are specially suited for application to the surfaces of cellulose acetate butyrate articles. Such articles may have been shaped by extrusion, injection or compression molding processes or coated from solvent solutions.

Heretofore various lacquer compositions have been formulated for the surface coating of plastics. However, little success has been attained in making a satisfactory metallic appearing or pigmented lacquer for use on cellulose acetate butyrate articles. In such lacquers difficulty was experienced in adhesion and durability. In fact, such well known highly resistant coatings made from epoxide resins cross-linked with polyamide resins were found to be entirely unsuited for coating cellulose acetate butyrate articles because they failed to adhere to cellulose acetate butyrate.

An object therefore of the present invention is an improved lacquer for use on cellulose acetate butyrate articles which has improved adherence and luster. Another object is an improved pigmented or metallized lacquer having superior adherence to cellulose acetate butyrate surfaces.

Other objects will appear hereinafter.

In accordance with the present invention these and other objects are attained by formulating a lacquer containing as the essential ingredients an epoxide resin, a polyamide resin and cellulose acetate butyrate in a compatible solvent mixture. I have found, whereas the epoxide-polyamide thermosetting resin fails to give satisfactory adherence to surfaces composed of cellulose acetate butyrate, that the addition of cellulose acetate butyrate to the epoxide-polyamide resin solution before it is heat hardened provides the necessary adhering property to these resins. It appears the epoxide resin reacts with both the polyamide resin and the cellulose acetate butyrate. Thus my invention permits using the highly resistant epoxide resins in this field of cellulose acetate butyrate plastics. Also in accordance with my invention I may add metallic powders or colored pigments to my novel lacquer composition and thus combine the aforesaid durability and adherence with pleasing decorative effects.

My novel lacquer compositions may be prepared according to the following general formulation:

COMPONENT A

| | Preferred Amounts | |
|---|---|---|
| | Weight (lbs.) | Volume (gals.) |
| Low Boiling Solvent (Toluol) | 5.50 | 0.85 |
| High Boiling Solvent (High Flash Solvent Naphtha) | 12.80 | 1.85 |
| Cellosolve Acetate (CH$_3$COOCH$_2$CH$_2$OC$_2$H$_5$) | 12.20 | 1.50 |
| Expoxide resin | 6.00 | 0.60 |
| Metallic Powder or Pigment | 5.00 | 0.28 |
| | 41.50 | 5.08 |

This general formulation may be varied somewhat by modifying the solvent content to alter drying time or application characteristics. The drying time can be accelerated by increasing the proportion of low boiling solvent to the higher boiling naphtha. If desired the low boilers can be from 5 to 12 parts by weight and the high boiler can be from 12 to 5 parts by weight of the high boiler-low boiler solvent mixture. The organic ester component may be employed in a range of 10 to 15 parts by weight and the resulting aromatic hydrocarbon-ester solvent combination will give suitable solution with the epoxide resin.

The epoxide resin is thoroughly dissolved by mixing in the solvents before the metallic powder or pigment is added. The metallic powder or pigment is then added and thoroughly dispersed in the formulation.

The metallic powder depending on the desired appearance may be metallic bronze powder, leafing or non-leafing, such as aluminum, copper or gold bronze powder. It is finely divided and is preferably of a size shown in the ASTM Standards, January 1955, page 131, type 1, Class A.

The pigment may be any of the standard coloring agents used in paint and lacquer formulations such as titanium dioxide, carbon black, iron blue, chrome green, etc.

COMPONENT B

| | Preferred Amounts | |
|---|---|---|
| | Weight (lbs.) | Volume (gals.) |
| Low Boiling Solvent | 3.10 | 0.50 |
| High Boiling Solvent (High Flash Solvent Naphtha) | 11.40 | 1.40 |
| ½ Second Cellulose Acetate Butyrate | 2.00 | 0.20 |
| Cellosolve Acetate (CH$_3$COOCH$_2$CH$_2$OC$_2$H$_5$) | 17.50 | 2.50 |
| Polyamide Resin | 3.00 | 0.40 |
| | 37.00 | 5.00 |

The high and low boiling solvents may be employed over a range of amounts between 3 to 12 parts by weight. The ester solvent component may be varied upwards or downwards by 10%.

The cellulose acetate butyrate is dissolved by aid of agitation in the solvent and the polyamide resin is then added with stirring until uniformly dispersed in the mixture.

The component parts A and B may be separately packaged in sealed containers if not to be used promptly. Equal volumes of component parts A and B are mixed together when the lacquer is to be coated onto the cellulose acetate butyrate article.

The lacquer may be coated onto the cellulose acetate butyrate plastic article by conventional methods, but spraying from a suitable spray gun is generally the preferred coating method.

The lacquer coating may be air or force dried at temperatures up to 170° F. to effect curing.

The epoxide resin employed in the A formulation is preferably that sold by Shell Chemical Company as "Epon" 1001 resin. The epoxide resins represent a class of condensation polymers and have the typical structure:

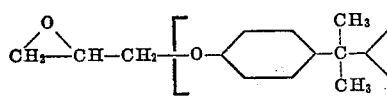

in which $n$ is a whole number from 1 to 5.

The polyamide which serves as a modifier as well as the curing and cross-linking agent cross links with the reactive hydroxyl and epoxide groups which are widely spaced along the epoxide chain and makes it thermosetting when heated as described herein.

The cellulose acetate butyrate employed in the lacquer contains from 35 to 39% butyryl groups and 12 to 15% acetyl groups and serves as the agent to lend to the composition the property of adhering to the cellulose acetate butyrate article.

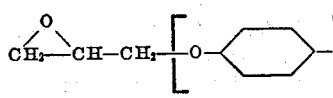

The polyamide resin employed in the B formulation is preferably that sold by General Mills as Polyamide Resin 115. This has a general formula:

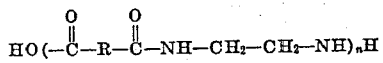

wherein $n$ is a whole number from 5 to 15 and R is an alkylene group having from 5 to 20 carbon atoms. A particularly useful compound is that in which R in the above formula is $C_{17}H_{34}$.

Other properties of "Epon" 1001 and "Polyamide Resin 115" are given in an article entitled "Coatings of Polyamide and Epoxy Resin Blends" by Renfrew et al., Industrial and Engineering Chemistry, vol. 46, No. 10, pages

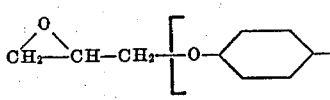

2,226 to 2,632, and particularly at page 2,227.

The following examples illustrate the use of my invention:

*Example 1*

A camera part of the cellulose acetate butyrate plastic, available on the market as Tenite Butyrate plastic, was formed by the injection molding process and was spray coated with the lacquer made by mixing lacquer components A and B together. The metallic powder in this instance was extra fine leafing aluminum bronze powder. This gave a firmly adherent bright aluminum appearing finish to the camera part. The coating was oven dried at 170° F. for 60 minutes.

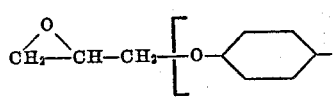

*Example 2*

Similar parts were coated and dried in the same manner, with the lacquer formed from mixing equal amounts of components A and B supra. The metallic powders were respectively copper bronze powder, pale gold bronze powder, antique bronze powder, statutory gold bronze, and brilliant bronze powder.

*Example 3*

Similar parts were coated with the lacquer formed from mixing equal amounts of components A and B, supra. In these instances the metallic powders were replaced with colored pigments. The pigments were respectively titanium dioxide, carbon black, yellow iron oxide, red iron oxide, chrome green, chrome yellow, iron blue, and inert pigments.

In general any pigment which has no undesirable reaction with the composition of the lacquer or the article being coated may be employed.

A decorative firmly adherent coating is thus attainable by employing my improved lacquer on cellulose acetate butyrate articles.

I claim:

1. A heat hardenable lacquer composition, the essential constituents of which comprise in a solvent therefor approximately 6 parts of an epoxide resin having the typical structure:

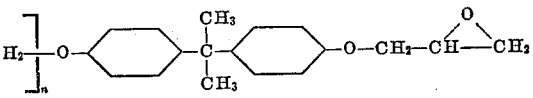

wherein $n$ is a whole number from 1 to 5, approximately 3 parts of a polyamide resin having the typical structure:

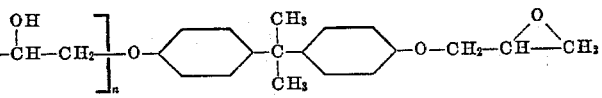

wherein $n$ is a whole number from 5 to 15 and R is an alkylene group having from 5 to 20 carbon atoms, and approximately 2 parts of cellulose acetate butyrate containing from 12 to 15% acetyl groups and 35 to 39% butyryl groups.

2. A heat hardenable lacquer composition, the essential constituents of which comprise in a solvent therefor approximately 6 parts of an epoxide resin having the typical structure:

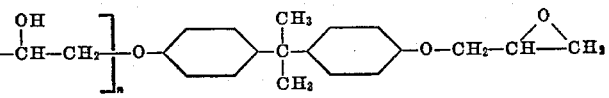

wherein $n$ is a whole number from 1 to 5, approximately 3 parts of a polyamide resin having the typical structure:

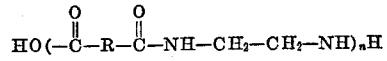

wherein $n$ is a whole number from 5 to 15 and R is an alkylene group having from 5 to 20 carbon atoms, and approximately 2 parts of cellulose acetate butyrate containing from 12 to 15% acetyl groups and 35 to 39% butyryl groups and a finely divided coloring agent.

3. A heat hardenable lacquer composition, the essential constituents of which comprise in a solvent therefor approximately 6 parts of an epoxide resin having the typical structure:

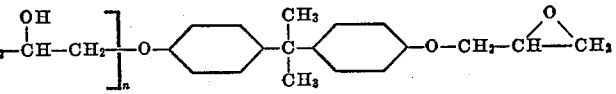

wherein $n$ is a whole number from 1 to 5, approximately 3 parts of a polyamide resin having the typical structure:

wherein $n$ is a whole number from 5 to 15 and R is an alkylene group having from 5 to 20 carbon atoms, and approximately 2 parts of cellulose acetate butyrate containing from 12 to 15% acetyl groups and 35 to 39% butyryl groups and finely divided aluminum bronze powder.

4. A cellulose acetate butyrate article having a surface coating thereon of a thermosetting lacquer, the essential constituents of which comprise the reaction product of approximately 6 parts of an epoxide resin having the typical structure:

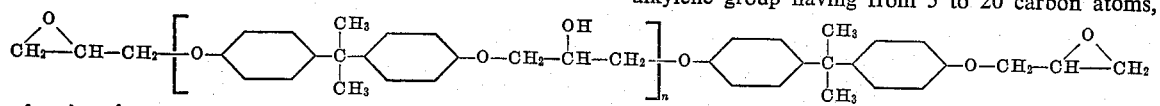

wherein $n$ is a whole number from 1 to 5, approximately 3 parts of a polyamide resin having the typical structure:

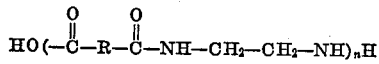

wherein $n$ is a whole number from 5 to 15 and R is an alkylene group having from 5 to 20 carbon atoms, and approximately 2 parts of cellulose acetate butyrate having from 12 to 15% acetyl groups and 35 to 39% butyryl groups.

References Cited in the file of this patent

UNITED STATES PATENTS

| | | |
|---|---|---|
| 2,190,770 | Carothers | Feb. 20, 1940 |
| 2,633,458 | Shokal | Mar. 31, 1953 |
| 2,703,284 | White et al. | Mar. 1, 1955 |
| 2,707,708 | Wittcoff | May 3, 1955 |
| 2,710,845 | Thompson | June 14, 1955 |
| 2,715,616 | MacIntosh | Aug. 16, 1955 |

OTHER REFERENCES

Renfrew et al.: Industrial and Engineering Chemistry, volume 46, No. 10, pages 2226 to 2632.

Chemical and Engineering, volume 31, November 9, 1953, page 4680.